(12) United States Patent
Ben Abdelaziz

(10) Patent No.: US 9,912,202 B2
(45) Date of Patent: Mar. 6, 2018

(54) WIRELESS CHARGER FOR AN ELECTRONIC DEVICE AND VEHICLE INTERIOR EQUIPMENT COMPRISING SUCH A CHARGER

(71) Applicant: Faurecia Interieur Industrie, Nanterre (FR)

(72) Inventor: Omar Ben Abdelaziz, Beuvais (FR)

(73) Assignee: Faurecia Interieur Industrie, Nanterre (FR)

( * ) Notice: Subject to any disclaimer, the term of this patent is extended or adjusted under 35 U.S.C. 154(b) by 636 days.

(21) Appl. No.: 14/506,522

(22) Filed: Oct. 3, 2014

(65) Prior Publication Data
US 2015/0097523 A1   Apr. 9, 2015

(30) Foreign Application Priority Data
Oct. 4, 2013   (FR) ...................................... 13 59639

(51) Int. Cl.
*H02J 7/00*   (2006.01)
*H02J 50/90*   (2016.01)
*H02J 7/02*   (2016.01)

(52) U.S. Cl.
CPC ............ *H02J 50/90* (2016.02); *H02J 7/0044* (2013.01); *H02J 7/0052* (2013.01); *H02J 7/025* (2013.01)

(58) Field of Classification Search
CPC .................................. H02J 7/025; H02J 50/90
USPC .......................................... 320/108; 307/104
See application file for complete search history.

(56) References Cited

U.S. PATENT DOCUMENTS

| 2009/0079270 A1* | 3/2009 | Jin .......................... H02J 7/025 307/104 |
| 2012/0313576 A1* | 12/2012 | Peiker ................... H02J 7/0044 320/108 |
| 2012/0326659 A1* | 12/2012 | Shukuya ................. H02J 7/025 320/108 |
| 2013/0049682 A1 | 2/2013 | Niec et al. |
| 2013/0088195 A1 | 4/2013 | Yoon et al. |
| 2013/0093259 A1 | 4/2013 | Hente et al. |
| 2015/0069961 A1* | 3/2015 | Chen ....................... H02J 7/025 320/108 |

FOREIGN PATENT DOCUMENTS

EP   2579420   4/2013

OTHER PUBLICATIONS

Search Report for application No. FR 1359639, dated Jul. 30, 2014, 3 pages.

* cited by examiner

*Primary Examiner* — David V Henze-Gongola
(74) *Attorney, Agent, or Firm* — Reising Ethington P.C.

(57) ABSTRACT

A wireless charger having a support for receiving an electronic device, the support including a base and a retaining element. The retaining element is movable relative to the base for assuming a position depending on the dimensions of the electronic device when it is retained on the support. The charger further includes a wireless energy emitter for wirelessly charging an electronic device retained on the support. The energy emitter is borne by a mechanism mechanically connecting the energy emitter to the base and to the retaining element. The mechanism is laid down so that a displacement of the retaining element relative to the base causes a displacement of the energy emitter relative to the base.

19 Claims, 2 Drawing Sheets

WIRELESS CHARGER FOR AN ELECTRONIC DEVICE AND VEHICLE INTERIOR EQUIPMENT COMPRISING SUCH A CHARGER

TECHNICAL FIELD

The present invention relates the field of wireless chargers for charging electric batteries of electronic devices.

BACKGROUND

For facilitating the charging of the electric battery of a portable electronic device such as a mobile phone or smartphone, it is possible to equip this electronic device with a receiving coil with a view to charging its battery by means of a wireless charger comprising an energy emitting coil for contactless electric energy transfer from the energy emitting coil to the receiving coil by inductive coupling.

The efficiency of such charging depends on proper alignment of the energy emitting coil and of the receiving coil. Poor alignments reduces the effectiveness and increases the charging time.

SUMMARY

EP 2 579 420 discloses a wireless charger comprising a body with an energy emitting coil and a holder for holding an electronic device, the holder being moved relatively to the body under the effect of the weight of the electronic device so as to align the energy emitting coil with a receiving coil of the electronic device.

One of the objects of the invention is to provide a wireless charger able to receive electronic devices of various dimensions while allowing efficient charging of their batteries.

For this purpose, the invention proposes a wireless charger for an electronic device, comprising a support for receiving an electronic device, said support comprising a base and a retaining element, said retaining element being movable relatively to the base so as to assume a position as a function of the dimensions of the electronic device in which the electronic device is retained on the support, the charger further comprising a wireless energy emitter for wireless charging an electronic device retained on the support, wherein the energy emitter is borne by a mechanism mechanically connecting the energy emitter to the base and to the retaining element, said mechanism being configured so that a displacement of the retaining element relative to the base causes a displacement of the energy emitter relative to the base.

The charger optionally comprises one or more of the following features, taken individually or according to all the technically possible combinations:
- the retaining element is movable along a first direction, said mechanism being configured so that a displacement of the retaining element along the first direction causes a displacement of the energy emitter having a component along the first direction and a component along a second direction perpendicular to the first direction;
- the energy emitter is slidably mounted relatively to the base along a third direction forming a non-zero angle with the first direction and with the second direction;
- the third direction is co-planar with the first direction and the second direction;
- the mechanism comprises a first mechanical connection mechanically connecting the retaining element to the base, the first mechanical connection being with a single degree of freedom in translation, along the first direction;
- the energy emitter is slidably mounted relatively to the retaining element along the second direction;
- the mechanism comprises a second mechanical connection mechanically connecting the energy emitter to the retaining element, the second mechanical connection being with a single degree of freedom in translation along the second direction;
- the mechanism comprises a third mechanical connection mechanically connecting the energy emitter to the base, the third mechanical connection being with a single degree of freedom in translation;
- the support delimits a receiving space delimited along the first direction between the retaining element and a first supporting element fixed relatively to the base;
- the receiving space is delimited along the second direction by a second fixed supporting element.

The invention also relates to a piece of equipment for the interior of a vehicle comprising a wireless charger as defined above.

BRIEF DESCRIPTION OF THE DRAWINGS

The invention and the advantages thereof will be better understood upon reading the description which follows, only given as example, and made with reference to the appended drawings wherein.

DETAILED DESCRIPTION OF THE ILLUSTRATED EMBODIMENT(S)

Figure 1:
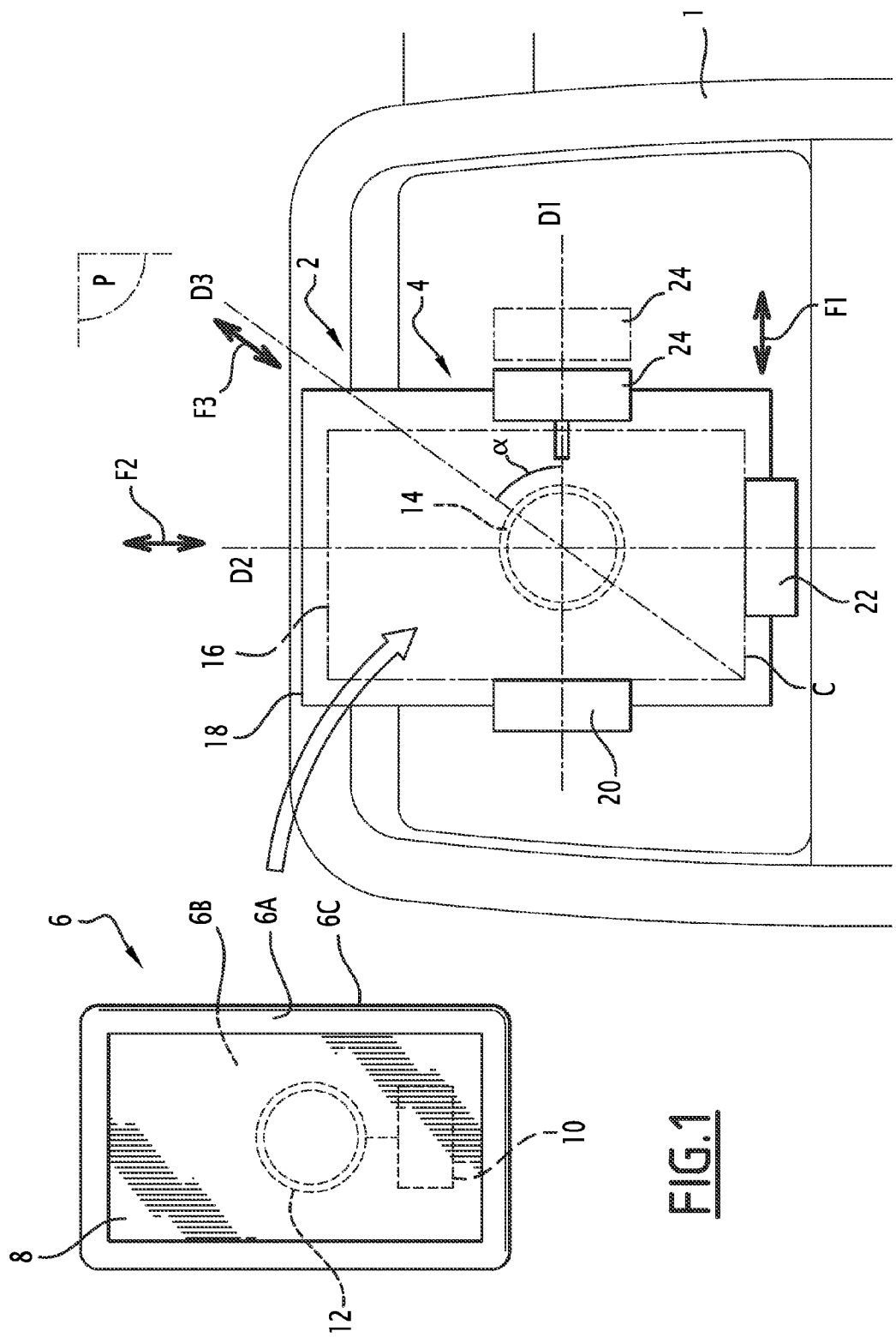
FIG. 1 is a schematic front view of a piece of interior equipment of a vehicle comprising a wireless charger for charging various electronic devices and an electronic device able to be placed on the charger.

As illustrated in FIG. 1, a vehicle interior equipment of a 1 comprises a wireless charger 2 for charging electronic devices.

The vehicle interior equipment 1 is for example a dashboard, a console, or an added element being attached on a vehicle interior trim element.

The wireless charger 2 comprises a support 4 for receiving the electronic device 6.

The electronic device 6 is portable. For example this is a mobile terminal, notably of a portable telephone, a smart phone, or a digital tablet.

The electronic device 6 has a front face 6A, provided with a screen 8, a rear face 6B opposite to the front face 6A, and edges 6C. The electronic device 6 in a front view has a substantially rectangular contour.

The electronic device 6 comprises a battery 10, for storing electric energy, and an inductive coupling receiving coil 12, the battery 10 being connected to the receiving coil 12 for wireless charging of the battery via the receiving coil 12.

The charger 2 comprises an energy emitting inductive coupling coil 14 borne by the support 4 and able to be coupled with the receiving coil 12 of the electronic device 6 received on the support 4, for transferring electric energy from the energy emitting coil 14 to the receiving coil 12 by inductive coupling between the coils, and charging the battery 10 of the electronic device 6.

The support 4 delimits a receiving space 16 extending along a first direction D1 and a second direction D2 perpendicular with each other, defining a plane P (plane of FIG. 1). The receiving space 16 extends along the plane P. The receiving space 16 is of a general rectangular shape as seen along the normal to the plane P (FIG. 1).

The support 4 comprises a fixed base 18.

The support 4 comprises a fixed first supporting element 20 provided for blocking the electronic device 6 along the first direction D1. The first supporting element 20 is rigidly secured to the base 18. The first supporting element 20 delimits the receiving space 16 in the first direction D1.

The support 4 comprises a fixed second supporting element 22 provided for blocking the electronic device 6 along the second direction D2. The second supporting element 22 is rigidly secured to the base 18. The second supporting element 22 delimits the receiving space 16 in the second direction D2.

The first supporting element 20 and the second supporting element 22 define two adjacent sides of the receiving space 16 joining up at a corner C.

The support 4 comprises a retaining element 24 moveably mounted on the base 18. The retaining element 24 is provided for blocking the electronic device 6 along the first direction D1, in the opposite direction of the first supporting element 20. The retaining element 24 and the first supporting element 20 are located on either side of the receiving space 16.

The receiving space 16 is delimited along the first direction D1 between the retaining element 24 and the first supporting element 20.

The retaining element 24 is movable relatively to the base 18 for adjusting the position of the retaining element 24 as a function of the dimensions of the electronic device 6.

The retaining element 24 is movable relatively to the support 4 in translation along the first direction D1 (arrow F1). The displacement of the retaining element 24 allows the distance between the retaining element 24 and the first supporting element 20 to be adjusted, for example as a function of the width of the electronic device 6. The retaining element 24 is illustrated in FIG. 1 in solid lines in a first position close to the first supporting element 20, and in dotted lines in a second position away from the first supporting element 20.

The receiving space 16 is delimited along the second direction D2 by the second supporting element 22. The receiving space 16 is open opposite to the second supporting element 22. Alternatively, the receiving space is closed opposite to the second supporting element 22, for example by a second adjustable retaining element translationally movable along the second direction D2.

The second supporting element 22 is arranged here for cooperating with a lower edge of the electronic device for supporting it vertically, while the first supporting element 20 and the retaining element 24 are arranged so as to cooperate with lateral edges of the electronic device 6 for maintaining it laterally and preventing its tilting.

The energy emitting coil 14 is mechanically connected to the retaining element 24 so that a displacement of the retaining element 24 causes a corresponding displacement of the energy emitting coil 14, so as to allow alignment of the energy emitting coil 14 with the receiving coil 12 of an electronic device 6 received on the support 4.

Thus, the position of the energy emitting coil 14 depends on the position of the retaining element 24 and therefore on the dimensions of the electronic device 6.

The energy emitting coil 14 is mechanically connected to the retaining element 24 so that a displacement of the retaining element 24 along the first direction D1 causes a corresponding displacement of the energy emitting coil 14, having a component along the first direction D1 (arrow F1) and a component along the second direction D2 (arrow F2).

More specifically, the energy emitting coil 14 is slidably mounted relatively to the base 18 along a third direction D3 forming a non-zero angle with the first direction D1 and a non-zero angle with the second direction D2. The first direction D1, the second direction D2 and the third direction D3 are coplanar. They are located in the plane P.

The third direction D3 is substantially oriented along a diagonal of the receiving space 16. This diagonal for example passes through the corner C of the receiving space 16 at the junction between the sides of the receiving space 16 delimited by the first supporting element 20 and the second supporting element 22.

The energy emitting coil 14 is mechanically connected to the base 18 and to the retaining element 24 so that a displacement of the retaining element 24 along the first direction D1 causes a corresponding displacement of the energy emitting coil 14 along the third direction D3 (arrow F3).

Figure 2:
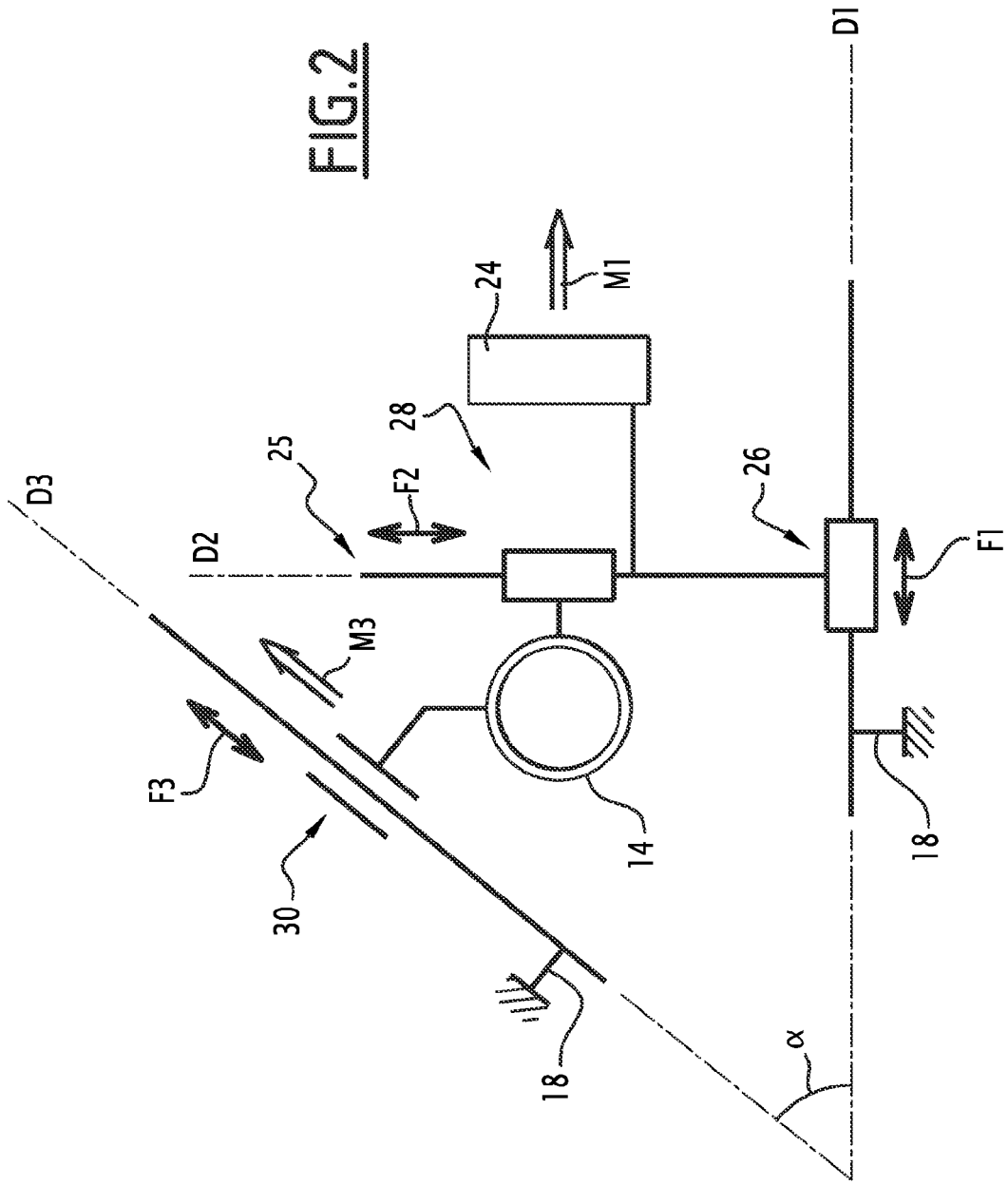
FIG. 2 is a kinematic diagram of the charger showing the mechanical connections between various elements of the charger.

As illustrated in FIG. 2, the coil 14 is borne by a mechanism 25 mechanically connecting the coil 14 to the base 18 and to the retaining element 24, said mechanism 25 being arranged so that a displacement of the retaining element 24 relatively to the base 18 causes a displacement of the coil 14 relatively to the base 18.

The mechanism 25 comprises a first connection 26 mechanically connecting the retaining element 24 to the base 18, the first connection 26 being with a single degree of freedom in translation along the first direction D1. The first connection 26 is here a sliding connection oriented along the first direction D1. Alternatively, the first connection is a sliding pivot connection (one degree of freedom in translation and a one degree of freedom in rotation) or an annular linear connection (one degree of freedom in translation and three degrees of freedom in rotation).

The mechanism 25 comprises a second connection 28 mechanically connect thing the energy emitting coil 14 to the retaining element 24, the second connection 28 being with a single degree of freedom in translation along the second direction D2. The second connection 28 is here a sliding connection oriented along the second direction D2. Alternatively, the second connection is a sliding pivot connection or an annular linear connection.

The mechanism 25 comprises a third connection 30 mechanically connecting the energy emitting coil 14 to the base 18, the third connection 30 being with a single degree of freedom in translation along the third direction D3. The third connection 30 is here a sliding pivot connection. Alternatively, the third connection is a sliding connection or a ring-shaped linear connection.

Because of the second connection 28, the energy emitting coil 14 is secured to the retaining element 24 in translation along the first direction D1, while being free in translation relatively to the retaining element 24 along the second direction D2. A displacement of the retaining element 24 along the first direction D1, causes the same displacement of the energy emitting coil 14 along the first direction D1.

Because of the third connection 30 which imposes displacement of the energy emitting coil 14 along the third direction D3, a displacement of the energy emitting coil 14 along the first direction D1 together with the retaining element causes a displacement of the energy emitting coil 14 along the second direction D2.

When operating, the user lays the electronic device 6 on the support 4, bearing upon the first supporting element 20 and the second supporting element 22. Next, he adjusts the position of the retaining element 24 in order to retain the electronic device 6 on the support 4, as a function of the dimensions of the electronic device 6.

The displacement of the retaining element 24 along the first direction D1 causes a displacement of the energy emitting coil 14 along the third direction D3, which has a component along the first direction D1 and a component along the second direction D2.

Given that the third direction D3 substantially extends along the diagonal of an electric device 6 received on the support 4, the energy emitting coil 14 is better centered relatively to the rear face of an electronic device 6 received on the support 4 then if it was only displaced along the first direction D1.

This allows better control of the alignment of the energy emitting coil 14 with a receiving coil 12 of the electric device 6. Indeed, the energy emitting coil 12 is generally substantially at the center of the rear face 6B of the electronic device 6.

Electronic devices 6 do not have all the same ratio between their width and their length. Also, the third direction D3 does not necessarily extend exactly along the diagonal of an electronic device 6 received on the support 4. However, the angle α between the first direction D1 and the third direction D3 is selected so as to obtain proper alignment for most of the electronic devices 6. Preferably, the angle α is comprised between 10° and 60°, and preferably between 20° and 45°.

Thus, for example, as illustrated in FIG. 2, a deviation of the retaining element 24 relatively to the first supporting element 20 (arrow M1), gives the possibility of moving the energy emitting coil 14 along an ascending oblique displacement (arrow M3), the energy emitting coil 14 moving away from the first supporting element 20, along the first direction D1, and moving away from the second supporting element 22, along the second direction D2.

Further, in another embodiment, not shown, a deviation of the retaining element 24 relatively to the first supporting element 20, gives the possibility of moving the energy emitting coil 14 according to a downward moving displacement, the energy emitting coil 14 moving away from the first supporting element 20, along the first direction D1, and that moving closer to the second supporting element 22, along the second direction D2. The change in the positioning of the electronic device from the portrait to landscape position allows alignment of the emitting and receiving coils.

Thus, with the invention it is possible to adjust the position of an energy emitting coil 14 of a wireless charger as a function of the dimensions of the electronic device received on the support of the charger, without having to specifically adjust the position of the energy emitting coil, but by coupling the displacement of the emitting transducer with an adjustable retaining element as a function of the dimensions of the device. The adjustment of the position of the energy emitting coil is therefore carried out transparently by the user. This adjustment in position of the emitting and receiving coils allows better energy transmission, thereby limiting the energy losses. With this alignment, it is possible to advantageously limit the consumption of energy and to reduce the charging time of the battery 10. The charger is simple to make and to use.

In the embodiment of FIGS. 1 and 2, the charger comprises an energy emitting coil, able to emit an electromagnetic field for wirelessly transmitting energy to a receiving coil, wherein the electromagnetic field induces a current. The energy transmission is therefore accomplished wirelessly by electromagnetic induction.

The embodiment of FIGS. 1 and 2 applying emitting and receiving coils for wirelessly transmitting energy by magnetic induction is non-limiting.

Alternatively, the wireless charger uses other methods for transmitting energy wirelessly. Other methods for wirelessly transmitting energy through electromagnetic fields are for example magnetic resonance transmission, near-field or microwave communication.

Thus, generally, the charger comprises a wireless energy emitter able to wirelessly transmit energy to a corresponding wireless energy receiver. In particular, the wireless energy emitter is an emitter of electromagnetic fields for wirelessly transmitting energy by means of an electromagnetic field, in particular by magnetic induction, by magnetic resonance, by near-field or microwave communication.

Advantageously, the charger 2 mainly consists of parts in plastic material. Thus, preferably, the base 18, the supporting and retaining elements 20, 22, 24, and/or the mechanism 25 are each made in one or several parts in plastic material.

The invention claimed is:

1. A wireless charger for an electronic device, comprising a support for receiving an electronic device, said support comprising a base and a retaining element, said retaining element being movable relatively to the base for assuming a position as a function of the dimensions of the electronic device, in which the electronic device is retained on the support, the charger further comprising a wireless energy emitter for wirelessly charging an electronic device retained on the support, wherein the energy emitter is borne by a mechanism mechanically connecting the energy emitter to the base and to the retaining element, said mechanism being configured so that a displacement of the retaining element relative to the base causes a displacement of the energy emitter relatively to the base, wherein the retaining element is movable along a first direction, said mechanism being configured so that a displacement of the retaining element along the first direction causes a displacement of the energy emitter having a component along the first direction and a component along a second direction perpendicular to the first direction, and wherein the energy emitter is slidably mounted relative to the base along a third direction forming a non-zero angle with the first direction and with the second direction.

2. The charger according to claim 1, wherein the third direction is coplanar with the first direction and the second direction.

3. The charger according to claim 1, wherein the mechanism comprises a mechanical connection mechanically connecting the retaining element to the base, the mechanical connection being with a single degree of freedom in translation, along the first direction.

4. The charger according to claim 1, wherein the mechanism comprises a mechanical connection mechanically connecting the energy emitter to the retaining element, the mechanical connection being with a single degree of freedom in translation along the second direction.

5. The charger according to claim 1, wherein the mechanism comprises a mechanical connection mechanically connecting the energy emitter to the base, the mechanical connection being with a single degree of freedom in translation.

6. The charger according to claim 1, wherein the support delimits a receiving space delimited along the first direction between the retaining element and a first fixed supporting element relative to the base.

7. The charger according to claim 6, wherein the receiving space is delimited along the second direction by a second fixed supporting element.

8. A piece of equipment for the interior of a vehicle comprising a wireless charger according to claim 1.

9. A wireless charger for an electronic device, comprising a support for receiving an electronic device, said support comprising a base and a retaining element, said retaining element being movable relative to the base for assuming a position as a function of the dimensions of the electronic device, in which the electronic device is retained on the support, the charger further comprising a wireless energy emitter for wirelessly charging an electronic device retained on the support, wherein the energy emitter is borne by a mechanism mechanically connecting the energy emitter to the base and to the retaining element, said mechanism being configured so that a displacement of the retaining element relative to the base causes a displacement of the energy emitter relative to the base,
wherein the retaining element is movable along a first direction, said mechanism being configured so that a displacement of the retaining element along the first direction causes a displacement of the energy emitter having a component along the first direction and a component along a second direction perpendicular to the first direction, and
wherein the mechanism comprises a mechanical connection mechanically connecting the energy emitter to the base, the mechanical connection being with a single degree of freedom in translation.

10. The charger according to claim 9, wherein the energy emitter is slidably mounted relative to the base along a third direction that is coplanar with the first direction and the second direction.

11. The charger according to claim 9, wherein the mechanism mechanically connects the retaining element to the base with a single degree of freedom in translation along the first direction.

12. The charger according to claim 9, wherein the mechanism mechanically connects the energy emitter to the retaining element with a single degree of freedom in translation along the second direction.

13. The charger according to claim 9, wherein the support delimits a receiving space delimited along the first direction between the retaining element and a first fixed supporting element relative to the base.

14. The charger according to claim 13, wherein the receiving space is delimited along the second direction by a second fixed supporting element.

15. A piece of equipment for the interior of a vehicle comprising a wireless charger according to claim 9.

16. A wireless charger for an electronic device comprising:
a support for receiving an electronic device equipped with a wireless energy receiver, said support comprising a base and a retaining element, said retaining element being movable relative to the base for assuming a position as a function of the dimensions of the electronic device, in which the electronic device is retained on the support; and
a wireless energy emitter for wirelessly charging the electronic device via the wireless energy receiver when retained on the support, wherein the energy emitter is borne by a mechanism mechanically connecting the energy emitter to the base and to the retaining element, said mechanism being configured so that a displacement of the retaining element relative to the base causes a displacement of the energy emitter relative to the base,
wherein the position of the energy emitter relative to the base is a function of the position of the retaining element relative to the base and independent from the position of the wireless energy receiver relative to the electronic device, and
wherein the mechanism is configured so that the displacement of the energy emitter relative to the base is in a direction different from a direction of the displacement of the retaining element relative to the base.

17. The charger according to claim 16, wherein the mechanism is configured so that the displacement of the energy emitter relative to the base is in a direction forming a non-zero angle with a direction of the displacement of the retaining element relative to the base.

18. The charger according to claim 16, wherein the mechanism is configured so that the displacement of the energy emitter relative to the base is in a direction forming a non-zero angle with a direction perpendicular to a direction of the displacement of the retaining element relative to the base.

19. The charger according to claim 16, wherein the mechanism is configured so that the displacement of the energy emitter relative to the base is in a direction different from and coplanar with a direction of the displacement of the retaining element relative to the base.

* * * * *